March 20, 1934.   F. LESLIE   1,951,917
WATER SOFTENER OR FILTER
Filed March 5, 1932
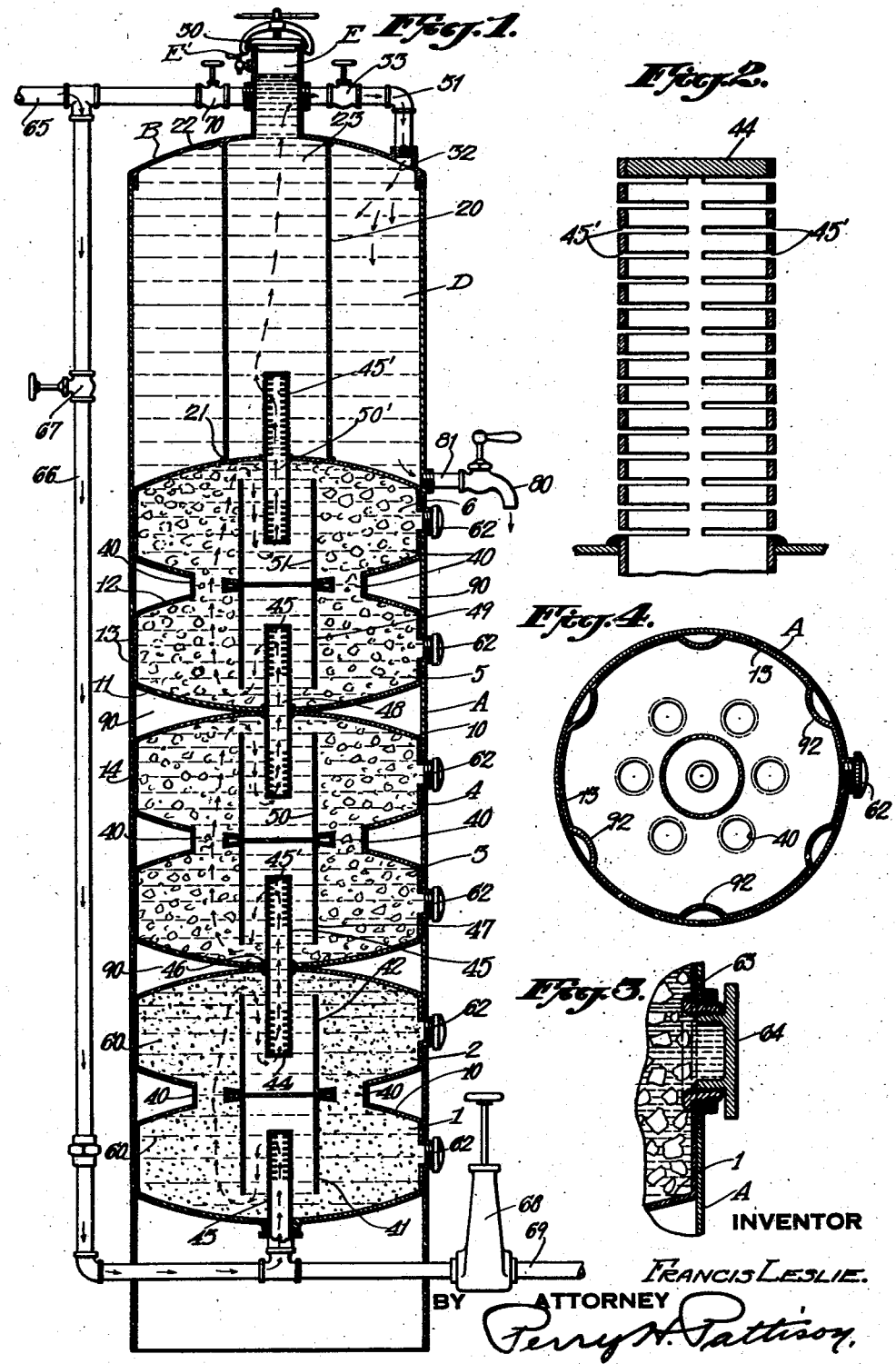
INVENTOR
FRANCIS LESLIE.
BY
ATTORNEY
Perry H. Pattison.

Patented Mar. 20, 1934

1,951,917

UNITED STATES PATENT OFFICE 1,951,917

WATER SOFTENER OR FILTER

Francis Leslie, Springfield, N. J.

Application March 5, 1932, Serial No. 597,045

13 Claims. (Cl. 210—24)

This invention relates to devices for treating liquids, and more particularly it pertains to devices for softening and filtering water.

A feature of the invention resides in a novel construction whereby an apparatus having a high capacity may be built upon a comparatively compact and small scale especially adapting the device for use as a household installation.

A further feature of the invention resides in a novel construction whereby the liquid being treated is circulated through a chemical treating bed in such a manner that the liquid being treated is presented to the entire bed of chemical thus greatly facilitating the operation of the machine.

Still a further feature of the invention resides in a novel construction and arrangement of parts whereby the chemical treating bed or beds may be subjected to a revivifying regenerating process without necessitating a complete disassembling of the machine.

Still a further feature of the invention resides in a novel construction whereby the chemical beds may be renewed from time to time without necessitating a disassembling of the machine.

Still another feature of the invention resides in a novel construction of casing and fluid storage tank whereby the device may be subjected to a revivifying operation without contamination of or detriment to fluid contained in the fluid storage tank.

Certain other features of the invention relate to a novel arrangement of filtering medium through which the fluid to be treated is passed before the fluid passes to the chemical beds for final treatment.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing:

Figure 1 is a longitudinal sectional view of an apparatus constructed in accordance with the present invention, Figure 2 is an enlarged detail longitudinal sectional view, on an enlarged scale, Figure 3 is an enlarged detail sectional view, and;

Figure 4 is a horizontal sectional view illustrating a modified form of the invention.

The invention includes a casing A which in the present embodiment is illustrated as of cylindrical form. The casing is adapted to occupy a vertical position and its upper end is closed by means of an end wall B, the lower end being preferably left open.

Arranged within the casing A, there are a plurality of chambers or compartments 10 and these chambers are preferably arranged in pairs. Each chamber or compartment preferably consists of two dished members 11 and 12 each having flanges 13 which meet as at 14 when two of said members are placed together to form a chamber or compartment. The members 11 and 12 are secured together by welding, brazing or otherwise at the joints 14 and are preferably welded or otherwise secured within the casing A.

In the present embodiment of the invention I have illustrated six such chambers but it is to be understood that I do not wish to limit myself to six chambers or compartments, and that the number may be increased or decreased to meet various conditions and requirements.

I do, however, preferably employ said chambers or compartments in equal numbers and preferably arrange them in groups of two. As herein illustrated, there are three groups of two each, and in such an arrangement the lower group of two or lower pair of chambers or compartments constitutes a filtering element, the two upper groups or pairs constituting an element for subjecting a fluid to a treatment, preferably of a chemical nature after the fluid has been treated to the preliminary filtering operation.

In its present illustration, the invention has been embodied in the form of an apparatus for filtering and softening water and when so constructed, the two lower chambers constitute a water filter and the four upper chambers constitute means wherein the water may be subjected to certain chemicals to produce the softening reaction as desired. However, if desired the filtering medium may be dispensed with.

By reference to Figure 1, it will be noted that there is considerable space between the top wall of the uppermost chamber or compartment and the top wall B of the casing A and this space I utilize as a storage tank D for the treated fluid. Disposed preferably centrally of this storage tank D there is a member 20, preferably of cylindrical form secured as at 21 to the top wall of the uppermost chamber or compartment and as at 22 to the end wall B of the casing. This member forms a chamber 23 within the storage tank D but this chamber, although it does under certain operating conditions form a part of the storage tank, does not have direct communication therewith and may be entirely cut off therefrom as will now be described.

The top wall B is provided with a head E having a vent preferably in the form of a pet-cock E' closed by a cap 30 and in direct communication with the chamber 23. Leading from this head E there is a pipe 31 which passes through the top wall B as at 32, and in which there is a hand valve 33. This pipe 31, when the hand valve 33 is open provides communication between the compartment 23 and the storage tank D, but which communication is cut off when said valve is closed.

I have numbered the chambers or compartments 10, as 1 to 6 progressing upwardly from the bottom one, the chamber or compartment designated 6 being the uppermost. The chambers or compartments 1 and 2 have communication with each other through passages 40 of which there may be any desired number. Depending from the top wall of the chamber or compartment 1 there is a baffle wall 41 preferably of circular form, and a similar baffle wall 42 extends upwardly from the bottom wall of the chamber or compartment designated 2. A fluid supply pipe 43 extends through the bottom wall of the chamber or compartment designated 1 and as shown this pipe extends well up into the baffle wall 41. The supply pipe 43 has its upper end closed by a plug or the like 44 and the fluid is discharged from said pipe through circumferentially extending slots 45' of which any desired number may be provided in the pipe adjacent the closed end.

The chambers or compartments 2 and 3, have communication with each other by means of a length of pipe 45 connected as at 46 by welding, brazing or otherwise to the meeting portions of the top and bottom walls of the chambers or compartments 2 and 3 respectively. This pipe 45 has both of its ends closed by plugs 44 and for a distance from each end it is formed with circumferential slots 45'. Its lower end extends well into the baffle wall 42 while its upper end extends well into a similar baffle wall 47 which depends from the top wall of the chamber or compartment 3.

The chambers or compartments 3 and 4 as do also the chambers or compartments 5 and 6, have communication with each other by passages 40 heretofore described and the chambers 4 and 5 have communication with each other by a pipe section 48 similar to the pipe section 45 heretofore described, the upper and lower ends of which are closed by plugs 44, and circumferentially slotted. These ends extend respectively well into baffle walls 49 and 50 in a manner similar to that already described.

The chamber or compartment 6 has communication with the compartment 23 by a length of pipe 50' the lower end of which extends well into a baffle wall 51 extending upwardly from the bottom wall of the chamber or compartment 6, to the upper end of the pipe extending upwardly into the compartment 23, the pipe secured to the top wall of the chamber or compartment 6. This pipe is similar in construction to the pipes 45 and 48 heretofore described except that the circumferentially extending slots 45' extend downwardly to the top wall of the uppermost chamber or compartment 6.

The two chambers or compartments 1 and 2 are filled with any suitable filtering medium 60 while the chambers or compartments 3, 4, 5 and 6 are filled with zeolite material which acts as a water softener. These materials are introduced into their respective compartments through filling openings 62. As best illustrated in Figure 3, these filling openings consist preferably of sleeve-like members 63 secured in the chambers or compartments and passing through the casing, the members 63 being closed by a screw cap 64.

The reference character 65 designates a main fluid supply which in the case of an ordinary water softening installation would connect with a water main. Leading from the main fluid supply there is a pipe 66 which has therein two valves 67 and 68. The pipe 43 heretofore mentioned is connected to the pipe 66 and from the valve 68, a pipe extension 69 leads to a sewer or other suitable disposal.

The main supply 65 leads into the head E and closely adjacent thereto, this pipe is provided with a valve 70.

When functioning as a water softener, the valves 68 and 70 will be closed, the valves 33 and 67 being open. Water will then flow from the main supply pipe 65 through the pipe 66 and upwardly through the pipe 43 from which it will be discharged laterally through the slots 45' thereof. The cylindrical baffle wall 41 directs the water downwardly and in passing around the lower end thereof, the water passes through the filtering bed in the chamber or compartment 1 from whence it passes through the passages 40 into the compartment 2. The water rising in the compartment 2 completely impregnates the filtering bed therein and when it rises to the level of the upper end of the baffle wall 42, it flows thereover filling the space within the same and rising through the pipe 45 to the chamber or compartment 3. In the compartment 3, the water passes through the zeolite bed and into the compartment 4 by way of the passages 40 into the chamber or compartment 5 by way of the pipe 48, to the chamber or compartment 6 by way of passages 40 and into the compartment 23 by way of the pipe 50. As the water fills the compartment 23, it passes by way of the pipe 31 to the storage tank D from which it may be drawn as desired.

The active life of the zeolite material is limited and it must from time to time be revivified or regenerated which is generally accomplished by subjecting it to the action of a brine or salt solution.

In the present device, when this action becomes necessary, the valves 33, 67 and 70 are closed and the valve 68 is opened. Salt is then introduced into the compartment 23 by removing the cap 30 after which the cap is replaced. The valve 70 is now opened and water from the main supply enters the compartment 23 from whence it passes by way of the pipe 50 to the chamber or compartment 6. From the chamber or compartment 6, the revivifying liquid passes by way of the passages 40 into the chamber or compartment 5 and thence by way of the pipe 48 to the chamber or compartment 4 from whence it passes by way of the passages 40 to the chamber or compartment 3. From the chamber or compartment 3, the revivifying liquid passes by way of the pipe 45 to the chamber or compartment 2 from whence it passes by way of the passages 40 to the chamber or compartment 1. From this chamber or compartment 1, the revivifying liquid passes by way of the pipe 43 to the waste 69 it being remembered that the valve 68 is open.

It is to be understood that this process is continued until such time as the zeolite material is completely revived or regenerated after which the water is allowed to flow until the revivifying liquid is completely flushed from the apparatus.

After the revivifying operation and subsequent flushing have been completed, the valves 68 and 70 are closed and the valves 33 and 67 opened after which the water flows through the apparatus as first described.

During the revivifying operation the valve 33 being closed, the revivifying liquid cannot enter the storage tank D and consequently treated water which may be contained therein will not become contaminated by the revivifying fluid.

Provision is made to drain the storage tank D should this become necessary and for this purpose a valve 80 connected with the bottom of the storage tank D by a pipe 81 is provided.

It will be noted that the top and bottom walls of the chambers or compartments 10 are all dished or curved. This construction provides a plurality of spaces 90 between the several chambers or compartments 10 which in the embodiment of the invention thus far described have no function.

In the modified form of the invention illustrated in Figure 4 of the drawing, I utilize these spaces by establishing communication between the several spaces and the storage tank D and thus the spaces 90 become a part of the storage tank.

Referring to Figure 4 it will be noted that the side walls 13 are provided with channels 92 preferably formed by depressing or bending said side walls inwardly of the chambers or compartments 10. This construction provides communication between the several spaces 90 and also between these spaces and the storage tank D thus increasing the capacity of the storage tank.

In addition to increasing the capacity of the storage tank D, this last mentioned construction has other advantages the most prominent of which will now be enumerated.

In such a construction, the several chambers or compartments, except of course the lowermost one, may be secured in the casing A merely by spot welding since any seepage around the chambers or compartments 10 would only facilitate the circulation between the several spaces 90 and said spaces and the storage tank D.

Again, such a construction permits of the use of lighter materials in the construction of the chambers or compartments 10 since the pressure upon the interior thereof is offset to some extent by the pressure present upon the outside thereof, a condition which does not exist in that form of the invention illustrated in Figure 1.

From the foregoing it will be apparent that the present invention provides a new and novel apparatus for the treatment of fluids and liquids which is highly efficient in performance, cheap of manufacture, simple of operation and which particularly lends itself to installation and operation in a water supply system for the purpose of providing filtered and softened water.

While the invention has been herein illustrated in its preferred form and in which it embodies a filtering medium, it is to be understood that the invention is not to be limited to the specific construction herein illustrated and that it may be practiced in other forms and particularly without the filtering medium, without departing from the spirit of the invention.

Having thus described the invention, what is claimed as new and what it is desired to secure by Letters Patent of the United States, is:

1. In apparatus for treating liquids, separate units for subjecting the liquid to be treated to processes of different character, means for establishing communication between said units, a single casing enclosing said units, said casing being extended beyond one of the units to provide a storage tank for the fluid after treatment, and a second storage tank within the first mentioned storage tank, said second storage tank having communication with the adjacent end unit.

2. In apparatus for treating liquids, separate units for subjecting the liquid to be treated to processes of different character, means for establishing communication between said units, a single casing enclosing said units, said casing being extended beyond one of the units to provide a storage tank for the fluid after treatment, with the end wall of the adjacent unit forming one end wall of said storage tank, a compartment within said storage tank, and means for establishing communication between said compartment and one of said units.

3. In apparatus for subjecting liquids to a plurality of individual treatments, a unit for effecting each treatment, said units having communication with each other, each of said units comprising a plurality of individual communicating chambers, a casing enclosing said units, and means wherby access to the interior of the individual chambers of the units may be had from the exterior of the enclosing casing.

4. In apparatus for subjecting liquids to a plurality of individual treatments, a unit for effecting each treatment, said units having communication with each other, ecah of said units comprising a plurality of individual communicating chambers, a casing enclosing said units, and means whereby access to the interior of the individual chambers of the units may be had from the exterior of the enclosing casing, said last mentioned means comprising a filling nozzle projecting from each chamber through the side wall of the casing.

5. In an apparatus for softening water, a casing, a water treating unit within the casing, a main water storage tank, an auxiliary water storage tank, said main water storage tank having communication with the water treating unit through said auxiliary water storage tank, and means for back washing said water treating unit through one of said water storage tanks to the exclusion of the other of said water storage tanks.

6. In an apparatus for softening water, a casing, a water treating unit within the casing and having an end wall spaced from an end wall of the casing to provide a main water storage tank, an auxiliary water storage tank arranged within the casing and said main water storage tank, and means for establishing direct communication between said auxiliary water storage tank and said water treating unit.

7. A water softening unit comprising a plurality of units, each comprising a pair of individual chemical carrying chambers, means for establishing communication between the chambers of pairs of chambers, and separate means for establishing communication between pairs of chambers, said last mentioned means comprising relatively short lengths of pipe extending from one chamber in one pair, into the adjacent chamber of an adjacent pair.

8. A water softening unit comprising a plurality of units, each comprising a pair of individual chemical carrying chambers, means for establishing communication between the chambers of pairs of chambers, and separate means for establishing communication between pairs of chambers, said last mentioned means comprising relatively short lengths of circumferentially slotted pipes having a closed upper end.

9. Apparatus for softening water comprising a casing, a portion thereof forming a storage tank for softened water, a plurality of separate chemical carrying chambers mounted within the casing and having portions spaced from each other, and means for establishing communication between the spaces between the chemical carrying chambers and the storage tank.

10. Apparatus for softening water comprising a casing a portion of which forms a storage tank for softened water, a plurality of chemical carrying chambers mounted within said casing, said chambers having curved sides whereby to provide intervening spaces between the chambers and channels formed in the sides of the chambers to provide communication between the spaces between the chambers and between said spaces and the water storage tank.

11. A water softener comprising a casing, chemical carrying chambers mounted within the casing and having communication with one another, a water storage tank, said water storage tank having an inner compartment, means for establishing water circulation in one direction through said chemical carrying chambers, the inner compartment of the water storage tank and in the opposite direction through the inner compartment of the water storage tank and chemical carrying chambers to the exclusion of the water storage tank.

12. An apparatus of the type described comprising a casing, a plurality of units mounted in said casing, each of said units comprising two communicating chambers with the communicating means between the chambers of each unit being spaced from the axis of the casing, and axially disposed means for establishing communication between the units.

13. An apparatus of the type described comprising a casing, a plurality of units mounted in said casing, each of said units comprising two communicating chambers with the communicating means between the chambers of each unit being spaced from the axis of the casing, and axially disposed means for establishing communication between the units, said axially disposed means comprising pipes extending in opposite directions into each of said units.

FRANCIS LESLIE.